(12) United States Patent
Ota

(10) Patent No.: US 8,225,350 B2
(45) Date of Patent: Jul. 17, 2012

(54) REMOTE COMMANDER INJECTING NEW USER INTERFACE (UI) INTO LEGACY CONTROLLED DEVICE TO PERMIT LEGACY CONTROLLED DEVICE TO WORK WITH NEW REMOTE COMMANDER

(75) Inventor: Takaaki Ota, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 400 days.

(21) Appl. No.: 12/606,415

(22) Filed: Oct. 27, 2009

(65) Prior Publication Data
US 2011/0096244 A1    Apr. 28, 2011

(51) Int. Cl.
G06F 3/00      (2006.01)
G06F 13/00     (2006.01)
H04N 5/445     (2011.01)

(52) U.S. Cl. ......... 725/38; 348/734; 348/569; 348/563; 725/39; 725/40; 725/28; 725/132; 725/140; 725/152; 725/44; 340/12.26; 717/168; 715/764; 726/17

(58) Field of Classification Search ................. 348/734, 348/569, 563; 725/132, 140, 152, 38, 40, 725/39, 28, 44; 717/168; 715/764; 726/17; 340/12.26

See application file for complete search history.

(56) References Cited

U.S. PATENT DOCUMENTS

| | | | |
|---|---|---|---|
| 6,407,779 B1 * | 6/2002 | Herz | 348/734 |
| 6,778,225 B2 * | 8/2004 | David | 348/734 |
| 6,985,069 B2 * | 1/2006 | Marmaropoulos | 340/12.26 |
| 7,562,383 B2 | 7/2009 | Thione et al. | |
| 8,031,270 B1 * | 10/2011 | Wisniewski et al. | 348/734 |
| 2008/0062337 A1 * | 3/2008 | Maier | 348/734 |
| 2008/0134237 A1 | 6/2008 | Tu et al. | |
| 2008/0178224 A1 * | 7/2008 | Laude et al. | 725/44 |
| 2009/0192637 A1 * | 7/2009 | Picunko et al. | 700/94 |

* cited by examiner

Primary Examiner — Jefferey Harold
Assistant Examiner — Mustafizur Rahman
(74) Attorney, Agent, or Firm — John L. Rogitz; John M. Rogitz

(57) ABSTRACT

A controlled device such as a TV is vended with a legacy remote commander (RC) and legacy user interfaces (UI), but is programmed with authentication information to accept downloaded UI updates from an authenticated after market RC with more capabilities than the legacy RC.

20 Claims, 3 Drawing Sheets

FIG. 3

- POWER SAVE
- AFTER 12 A.M.

FIG. 4

- POWER SAVE
- EXIT WHEN MOTION IS IN ROOM

FIG. 5

- POWER SAVE
- EXIT ONLY WHEN APPROVED PERSON TOUCHES FINGER PRINT READER

REMOTE COMMANDER INJECTING NEW USER INTERFACE (UI) INTO LEGACY CONTROLLED DEVICE TO PERMIT LEGACY CONTROLLED DEVICE TO WORK WITH NEW REMOTE COMMANDER

I. FIELD OF THE INVENTION

The present application is directed to providing after market remote commanders (RC) for controlled devices such as TVs that can download updated user interface (UI) software into the controlled device to permit the controlled device to take full advantage of the new RC.

II. BACKGROUND OF THE INVENTION

Controlled devices such as TVs, disk players, computers, video recorders, set-top boxes and the like are often sold with remote commanders (RC). A RC can be manipulated by a person to wirelessly transmit, typically by infrared or radiofrequency, input commands to a UI generated by the controlled device. The input commands to the UI cause the controlled device to execute a function such as change channel, change volume, present another UI, change an input source, etc.

As understood herein, after providing a controlled device with RC in the marketplace, a manufacturer might develop new RC features and/or technology. However, as also understood herein, such an after market RC might require the controlled device to support a new UI that the controlled device does not have.

SUMMARY OF THE INVENTION

Accordingly, a system includes a controlled device and a remote commander (RC) to control the device. The controlled device is programmed prior to sale to accept user interface (UI) renewability. Consequently, an authenticated peripheral device such as a new after market RC can upload/inject software for a new UI to the controlled device, which then changes its "personality" accordingly. This allows exotic after market RCs remote commander (for example, one having a touch pad and/or display and/or motion sensor and/or finger print reader (FPR), etc.) to be introduced after the launch of the controlled device into the market, and still have its full capabilities when used with a legacy controlled device. In other words, after programming from the after market RC the controlled device acts in a new way to take advantage of the new physical features of the after market RC.

In one implementation a controlled device includes a processor, a display controlled by the processor to present a legacy user interface (UI), and a storage medium accessible to the processor and storing software executable by the processor to present the UI on the display and to execute one or more actions in response to input to the UI generated by a legacy remote commander (RC). The processor is programmed with authentication information and in response to a successful attempt at authentication by an after market RC based on the authentication information, the processor causes updated software to be stored by the storage medium. The processor subsequently executes the updated software in response to signals from the after market RC to present an updated UI on the display. The updated UI is different from the legacy UI, and the processor executes one or more actions in response to input to the updated UI generated by the after market RC.

In examples, the controlled device is a TV having a housing and a tuner in the housing, with the processor, medium, and display being supported on the housing. If desired, the updated UI may replace the legacy UI such that the processor presents only the updated UI and never presents the legacy UI regardless of RC signals received by the processor. The after market RC might be available only after vending the controlled device with legacy RC.

By way of example, the after market RC may have at least one hardware feature not possessed by the legacy RC, and the updated UI facilitates use of the hardware feature. For example, the new hardware feature can be a fingerprint reader (FPR) or a motion sensor.

In another aspect, a remote commander (RC) has a housing, a processor in the housing, a computer readable storage medium in the housing and accessible to the processor, and an input device manipulable by a person to input commands to the processor. A wireless transmitter receives output from the processor. A user interface (UI) is embodied in software on the storage medium, and the processor causes the UI to be sent via the wireless transmitter to a controlled device for display of the UI on the controlled device.

In another aspect, a system includes an after market remote commander (RC) and a TV vended with a legacy RC and legacy user interfaces (UI) associated with use of the legacy RC. The TV is programmed, however, with authentication information to accept downloaded UI updates from an authenticated after market RC with more capabilities than the legacy RC. The UI updates are associated with use of the after market RC.

BRIEF DESCRIPTION OF THE DRAWINGS

FIG. 2A is a flow chart of example authentication operation using the after market remote control;

FIG. 3 shows a non-limiting example of a legacy user interface (UI) with which the controlled device as vended is programmed, in this case, a UI directed to allowing a user to establish power save mode settings in which the controlled device enters and exits a low power or sleep state, it being understood that a variety of other UIs similarly are typically provided; and FIGS. 4 and 5 show non-limiting examples of new UIs the software for which is downloaded from the after market RC to the controlled device, again using, for illustration purposes only, a UI related to a power save mode, it being understood that a variety of other UIs similarly can be updated or even provided as entirely new UIs.

DETAILED DESCRIPTION OF THE PREFERRED EMBODIMENT

Figure 1:
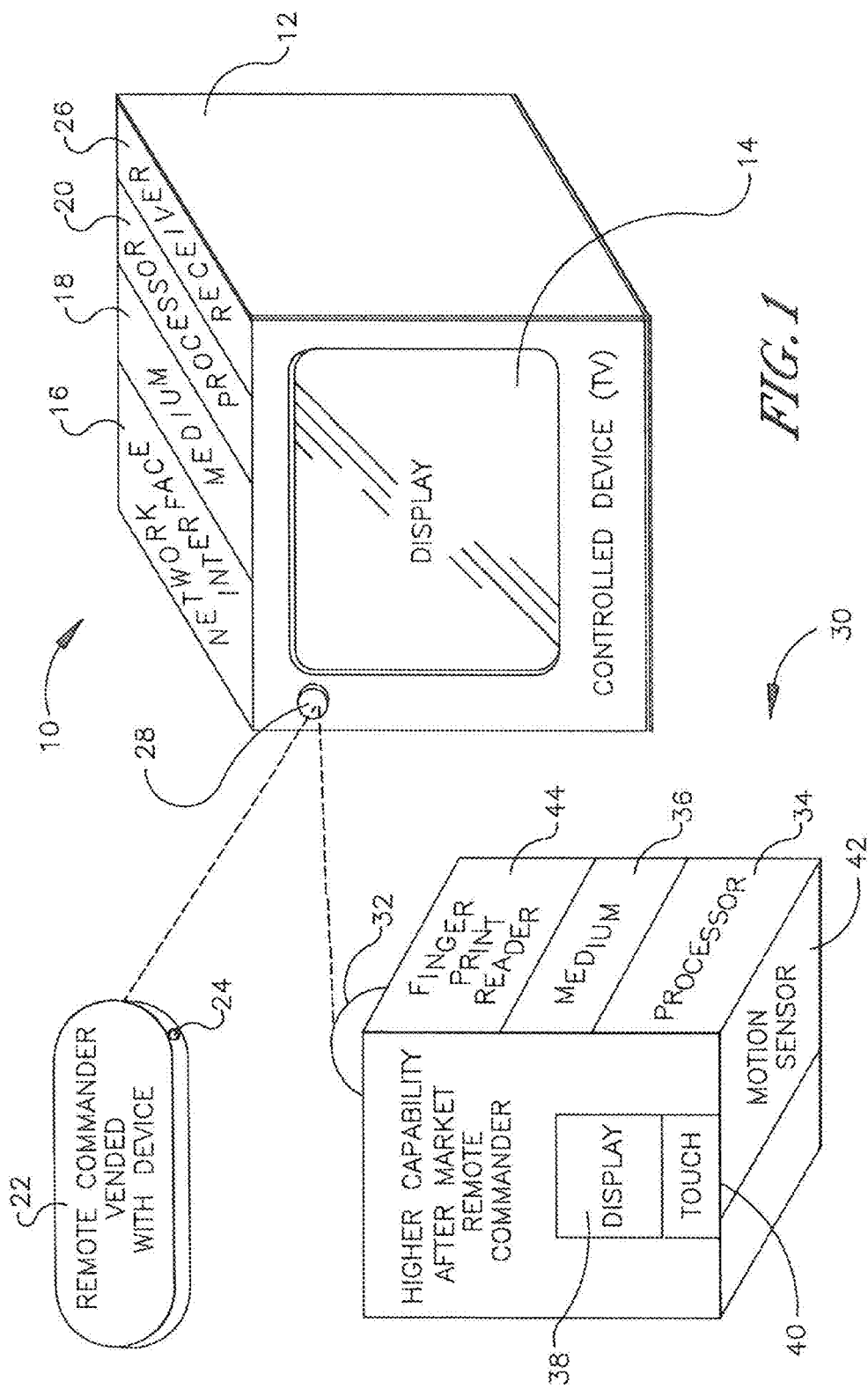
FIG. 1 is a block diagram of a non-limiting system in accordance with present principles.

Beginning initially with FIG. 1, a controlled device having a user interface capable of receiving updated software from an after market remote commander is shown. The controlled device 10 shown in FIG. 1 may be a television set having a housing 12 and a display 14 supported on the housing 12 in non-limiting embodiments. However, the present invention may be applied to other implementations not described herein, such as between a host device and a peripheral device.

The controlled device 10 shown in FIG. 1 also has a network interface 16. The network interface 16 and a storage medium 18 may both be supported on the housing 12.

Further, a processor 20 is also supported on the housing 12 and may control the display 14 to present a legacy user interface (UI) to a user. The processor 20 is understood to be capable of accessing and executing software on the storage medium 18 associated with the legacy UI to display the legacy UI on the display 14. The processor 20 is also capable of executing one or more actions or commands (such as change channel, change volume, present another UI, change an input source, etc.) in response to input generated by a legacy remote commander (RC) 22 in non-limiting embodiments. It is to be understood that the legacy RC 22 is vended with the controlled device 10 and is associated with the legacy UI.

Further still, the legacy RC 22 has a wireless transmitter 24 which may wirelessly communicate with a TV signal receiver 26 (which may be embodied as a TV tuner) on the controlled device 10 through a wireless receiver 28, the TV signal receiver 26 and wireless receiver 28 both being embodied on the housing 12. In non-limiting embodiments, the transmitter 24 and receiver 28 may use infrared or radiofrequency to transmit and receive information.

Still referencing FIG. 1, an after market remote commander (RC) 30 is also shown. It is to be understood that the after market RC 30 is made available after vending the controlled device 10 with the legacy RC 22. Furthermore, the after market RC 30 is understood to typically have more capabilities and/or features than the original legacy RC 22, such as allowing user input through additional hardware features on the after market RC 30. Those additional features will be discussed further below.

Still describing the after market RC 30, it has a wireless transmitter 32 to wirelessly communicate with the controlled device 10 by the same means as the legacy RC 22. The after market RC 30 also includes a processor 34 and a storage medium 36. Upon proper authentication of the after market RC 30, the storage medium 36 stores UI software updates which are to be uploaded to the storage medium 18 of the controlled device 10. Thus, the processor 34 may cause an updated UI stored on the storage medium 36 to be sent via the wireless transmitter 32 to the controlled device 10 to be safely stored by the storage medium 18. Alternatively, the processor 20 may request updated software from the after market RC 30, which is then stored safely by the storage medium 18. Either way, the processor 20 may then execute one or more actions in response to input to the updated UI generated by the after market RC 30.

As alluded to above, mutual authentication of the after market RC 30 and the controlled device 10 may be required in non-limiting embodiments before the UI may be updated. Such authentication is performed to ascertain that the after market RC 30 was indeed intended to update the UI of the controlled device 10. In such non-limiting embodiments, the processor 20 and the processor 34 are both understood to have been programmed with corresponding authentication information when vended. For example, authentication may be performed either by user confirmation that the after market RC 30 should be used or through automatic authentication without requiring user confirmation in non-limiting embodiments.

Once authentication has been performed and the legacy UI has been updated, it is to be understood that the processor 20 presents only an updated UI and preferably never presents the legacy UI again, regardless of signals received by either the legacy RC 22 or the after market RC 30. Thus, the processor 20 may subsequently execute the updated software in response to signals from the after market RC 30 to present only the newly updated UI on the display 14. The need for a user to separately install additional software when purchasing an after market RC is thereby eliminated.

The updated UI may thereafter facilitate the use of new hardware features of the after market RC 30. Moreover, these additional hardware features on the after market RC 30 are understood to have not been possessed by the legacy RC 22.

One example of an additional hardware feature on the RC 30 shown in FIG. 1 is a display 38, the display 38 being capable of presenting electronic images to a user. Another example includes a button-less touch screen 40 which a user may use to input commands into the RC 30, which are then to be transmitted to the controlled device 10. Still other examples of additional hardware features embodied on an after market RC such as the RC 30 include a motion sensor 42 and a user fingerprint reader 44.

Figure 2:
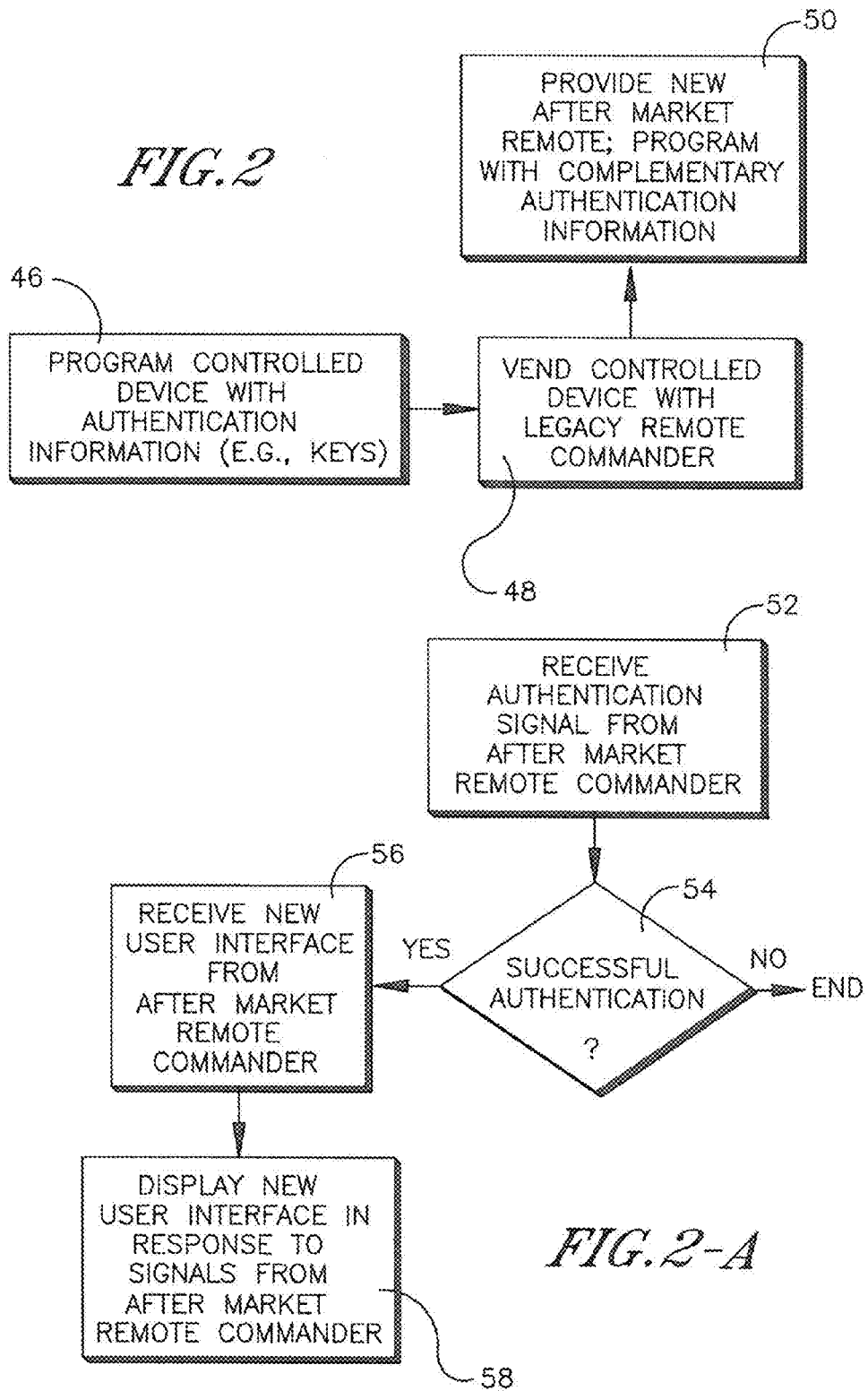
FIG. 2 is a flow chart of example operation in accordance with present principles, it being understood that portions of the illustrated logic may be implemented as logic by one or more of the processors disclosed herein.

Moving on to FIG. 2, a flow chart of example operation in accordance with present principles is shown.

Beginning with block 46, a controlled device, such as the controlled device 10 described in FIG. 1, is programmed with authentication information (e.g. keys). Moving to block 48, the controlled device is vended with a legacy remote commander such as, e.g., the legacy RC 22 described in FIG. 1. Then at block 50, a new, after market remote commander is provided only after vending of the original controlled device with legacy remote commander. This after market remote commander is programmed with authentication information complementary to the controlled device's authentication information.

Once the after market RC is possessed the user the logic of FIG. 2A may be implemented. It is to be understood that portions of FIG. 2A may be implemented as logic by one or more of the processors disclosed herein. Commencing at block 52, the controlled device processor receives an authentication signal from the after market remote commander. This authentication signal may be initiated by the after market remote commander by any number of means, including but not limited to user input or automatic signal generation when the after market remote commander is within signal range of the controlling device.

Moving to decision diamond 54, the logic determines whether a successful authentication of the after market remote commander has been made. If a successful authentication is not made, the logic ends. If, however, a successful authentication is made, the logic then continues on to block 56.

At block 56, the logic allows the new user interface associated with the after market remote commander to be received by the controlled device. Thus, the new user interface replaces the previous user interface which was vended with the controlled device. Then, concluding at block 58, the new user interface is displayed on the display of the controlled device in response to signals from the after market remote commander.

Continuing now in reference to FIG. 3, a non-limiting example of a legacy user interface (UI) as vended with the corresponding controlled device is shown. In the particular example embodiment shown in FIG. 3, a user interface directed to allowing a user to establish power save mode settings in which the controlled device enters and exits a low power or sleep state is shown. As shown in FIG. 3, such a power save mode will be initiated after 12:00 AM. However, it is to be understood that a variety of other legacy user interfaces may accompany a controlled device in other non-limiting embodiments.

Now referencing FIGS. 4 and 5, non-limiting examples of new, updated user interfaces are shown. The software for these new user interfaces is understood to have been downloaded from an after market RC to a controlled device, both of which are not shown in FIGS. 4 and 5. Again, for illustration purposes only, two user interfaces related to a power save mode are shown. However, it is to be understood that a variety of other user interfaces may be similarly updated or even provided as entirely new user interfaces in non-limiting embodiments.

With respect to FIG. 4, a power save mode may be exited when motion is detected in the room where the controlled device is located. In non-limiting embodiments, motion may be detected by a motion sensor also located in the same room, such as the motion sensor 42 on the after market RC 30 described in FIG. 1.

With respect to FIG. 5, a power save mode may be exited only when an approved person touches a fingerprint reader. One non-limiting example of such a fingerprint reader is the fingerprint reader 44 on the after market RC 30 described in FIG. 1. However, it is to be understood that a fingerprint reader may also be embodied on the housing of a controlled device or even separate from both the controlled device and after market remote commander in still other non-limiting embodiments.

While the particular REMOTE COMMANDER INJECTING NEW USER INTERFACE (UI) INTO LEGACY CONTROLLED DEVICE TO PERMIT LEGACY CONTROLLED DEVICE TO WORK WITH NEW REMOTE COMMANDER is herein shown and described in detail, it is to be understood that the subject matter which is encompassed by the present invention is limited only by the claims.

What is claimed is:

1. A controlled device comprising:
a processor;
a display controlled by the processor to present a legacy user interface (UI);
a storage medium accessible to the processor and storing software executable by the processor to present the UI on the display and to execute one or more actions in response to input to the UI generated by a legacy remote commander (RC), wherein
the processor is programmed with authentication information and in response to a successful attempt at authentication by an after market RC based on the authentication information, the processor causes updated software to be stored by the storage medium, the processor subsequently executing the updated software in response to signals from the after market RC to present an updated UI on the display, the updated UI being different from the legacy UI, the processor executing one or more actions in response to input to the updated UI generated by the after market RC;
the controlled device being vended with the legacy RC which is associated with use of the legacy UI, the controlled device being programmed with the authentication information to accept downloaded UI updates from an authenticated after market RC with more capabilities than the legacy RC, the UI updates being associated with use of the after market RC.

2. The controlled device of claim 1, wherein the controlled device is a TV having a housing and a TV signal receiver in the housing, the processor, medium, and display being supported on the housing.

3. The controlled device of claim 1, wherein the updated UI replaces the legacy UI such that the processor presents only the updated UI and never presents the legacy UI regardless of RC signals received by the processor.

4. The controlled device of claim 1, wherein the after market RC is available only after vending the controlled device with legacy RC.

5. The controlled device of claim 1, wherein the after market RC has at least one hardware feature not possessed by the legacy RC, the updated UI facilitating use of the hardware feature.

6. The controlled device of claim 5, wherein the hardware feature is a fingerprint reader (FPR).

7. The controlled device of claim 5, wherein the hardware feature is a motion sensor.

8. A remote commander (RC), comprising:
a housing;
a processor in the housing;
a computer readable storage medium in the housing and accessible to the processor;
an input device manipulable by a person to input commands to the processor;
a wireless transmitter receiving output from the processor;
a user interface (UI) embodied in software on the storage medium; wherein
the processor causes the UI to be sent via the wireless transmitter to a controlled device for display of the UI on the controlled device;
the UI being an after market UI and the RC being an after market RC such that the controlled device, which is vended with a legacy RC and a legacy user interfaces (UI) associated with use of the legacy RC, determines based on authentication information from the after market RC to accept the UI from the after market RC with more capabilities than the legacy RC, the UI from the after market RC being associated with use of the after market RC.

9. The RC of claim 8, wherein the processor sends the UI to the controlled device only upon mutual authentication of the controlled device and RC.

10. The RC of claim 8, wherein the controlled device is a TV having a housing supporting a tuner in the housing, a processor, a storage medium, and a display.

11. The RC of claim 8, wherein the UI is an updated UI that replaces a legacy UI stored in the controlled device such that the processor of the controlled device presents only the updated UI and never presents the legacy UI regardless of RC signals received by the processor of the controlled device.

12. The RC of claim 8, wherein the RC is available only after vending the controlled device with a legacy RC.

13. The RC of claim 12, wherein the RC has at least one hardware feature not possessed by the legacy RC, the updated UI facilitating use of the hardware feature.

14. The RC device of claim 13, wherein the hardware feature is a fingerprint reader (FPR).

15. The RC of claim 13, wherein the hardware feature is a motion sensor.

16. a system comprising:
an after market remote commander (RC); and
a TV vended with a legacy RC and legacy user interfaces (UI) associated with use of the legacy RC, the TV being programmed with authentication information to accept downloaded UI updates from an authenticated after market RC with more capabilities than the legacy RC, the UI updates being associated with use of the after market RC, the TV including a processor, a display controlled by the processor to present the legacy UI, a storage medium accessible to the processor and storing software executable by the processor to present the legacy UI on the display and to execute one or more actions in response to input to the UI generated by a legacy remote commander (RC), wherein the processor is programmed with the authentication information and in response to a successful attempt at authentication by the after market RC based on the authentication information, the processor causes the downloaded UI updates to be stored by the storage medium, the processor subsequently executing the downloaded UI updates in response to signals from the after market RC to present an updated UI on the display, the updated UI being different from the legacy UI, the processor executing one or more actions in response to input to the updated UI generated by the after market RC.

17. The system of claim 16, wherein the TV executes the UI updates in response to signals from the after market RC to present an updated UI on the display, the updated UI being different from the legacy UI, the TV executing one or more actions in response to input to the updated UI generated by the after market RC.

18. The system of claim 16, wherein the UI updates replace the legacy UI such that the TV presents only the UI updates and never presents the legacy UI regardless of RC signals received by the TV.

19. The system of claim 16, wherein the after market RC is available only after vending the TV with legacy RC.

20. The system of claim 16, wherein the after market RC has at least one hardware feature not possessed by the legacy RC, the UI updates facilitating use of the hardware feature.

* * * * *